United States Patent
Nishiyama et al.

(10) Patent No.: US 11,096,436 B2
(45) Date of Patent: Aug. 24, 2021

(54) BEADINGS

(71) Applicants: TOYOTA BOSHOKU KABUSHIKI KAISHA, Aichi (JP); YKK CORPORATION, Tokyo (JP)

(72) Inventors: Kunio Nishiyama, Aichi-ken (JP); Mitsuo Kobayashi, Aichi-ken (JP); Eiichi Sasada, Tokyo (JP); Makoto Yamazaki, Toyama-ken (JP)

(73) Assignees: TOYOTA BOSHOKU KABUSHIKI KAISHA, Aichi-Ken (JP); YKK CORPORATION, Tokyo (JP)

( * ) Notice: Subject to any disclaimer, the term of this patent is extended or adjusted under 35 U.S.C. 154(b) by 807 days.

(21) Appl. No.: 14/910,452

(22) PCT Filed: Aug. 12, 2014

(86) PCT No.: PCT/JP2014/004178
§ 371 (c)(1),
(2) Date: Feb. 5, 2016

(87) PCT Pub. No.: WO2015/029356
PCT Pub. Date: Mar. 5, 2015

(65) Prior Publication Data
US 2016/0174637 A1 Jun. 23, 2016

(30) Foreign Application Priority Data
Aug. 29, 2013 (JP) .............................. JP2013-177824

(51) Int. Cl.
*A41D 27/08* (2006.01)
*B60N 2/58* (2006.01)
(Continued)

(52) U.S. Cl.
CPC ............ *A41D 27/08* (2013.01); *A43B 1/0036* (2013.01); *A43B 23/24* (2013.01); *B60N 2/58* (2013.01);
(Continued)

(58) Field of Classification Search
CPC .. A41D 2300/50; B60Q 3/233; B60N 2/5891; B60N 2/58
(Continued)

(56) References Cited

U.S. PATENT DOCUMENTS 3,866,554 A * 2/1975 Holtzman .............. A45C 3/001
112/419
6,450,678 B1 * 9/2002 Bayersdorfer ........... B60Q 3/54
362/488
(Continued)

FOREIGN PATENT DOCUMENTS

DE 20 2005 003 613 6/2005
FR 2 888 574 1/2007
(Continued)

OTHER PUBLICATIONS

Swart, Helmut, Illuminated weatherstrip for automobiles has at least one at least partly transparent sleeve arranged about light source so that part of sleeve forms vane for attaching illumination device, 2005, EPO, pp. 1-19 (Year: 2005).*
(Continued)

*Primary Examiner* — Travis M Figg
*Assistant Examiner* — Ethan Weydemeyer
(74) *Attorney, Agent, or Firm* — Greenblum & Bernstein, P.L.C.

(57) ABSTRACT

Embodiments of the present invention may include beading for decorating a target member. The beading has a linear member, a leg portion and a colored portion. The linear member has a main portion formed of a light-transmitting
(Continued)

material. The linear member has a first end and a second end opposite the first end on an outer periphery thereof. The leg portion extends from the first end of the linear member. The leg portion has a sewn portion that is sewn onto the target member by sewing thread. The colored portion is provided in the linear member or the leg portion. The colored portion has a smaller quantity of transmitting light than that of the main portion. The colored portion is situated and configured to suppress the visibility of the sewing thread when the linear member is seen from above the second end.

17 Claims, 9 Drawing Sheets

(51) Int. Cl.
*A43B 23/24* (2006.01)
*B68G 7/10* (2006.01)
*A43B 1/00* (2006.01)
*B60Q 3/233* (2017.01)

(52) U.S. Cl.
CPC ........... *B60N 2/5891* (2013.01); *B60Q 3/233* (2017.02); *B68G 7/105* (2013.01); *A41D 2300/50* (2013.01)

(58) Field of Classification Search
USPC .................. 12/146 B, 146 W; 24/1; 36/137; 190/102, 124; 362/459–549
See application file for complete search history.

(56) References Cited

U.S. PATENT DOCUMENTS

| | | |
|---|---|---|
| 2010/0296302 A1 | 11/2010 | Welch, Sr. et al. |
| 2013/0077338 A1 | 3/2013 | Wenzel et al. |

FOREIGN PATENT DOCUMENTS

| | | | | |
|---|---|---|---|---|
| JP | 61-174497 | 10/1986 | | |
| JP | 1-177600 | 12/1989 | | |
| JP | 2009-279999 | 12/2009 | | |
| JP | 2009279999 A | * 12/2009 | | ............... B60Q 3/02 |
| WO | 2009/058723 | 5/2009 | | |

OTHER PUBLICATIONS

International Search Report for PCT/JP2014/004178 dated Oct. 23, 2014.
Japanese Office Action for JP App. No. 2013-177824 dated Dec. 5, 2016, along with English-language translation thereof.
German Office Action in counterpart German Application No. 11 2014 003 957.8, dated Jan. 15, 2020 (along with English translation thereof).

* cited by examiner

[Fig. 1]
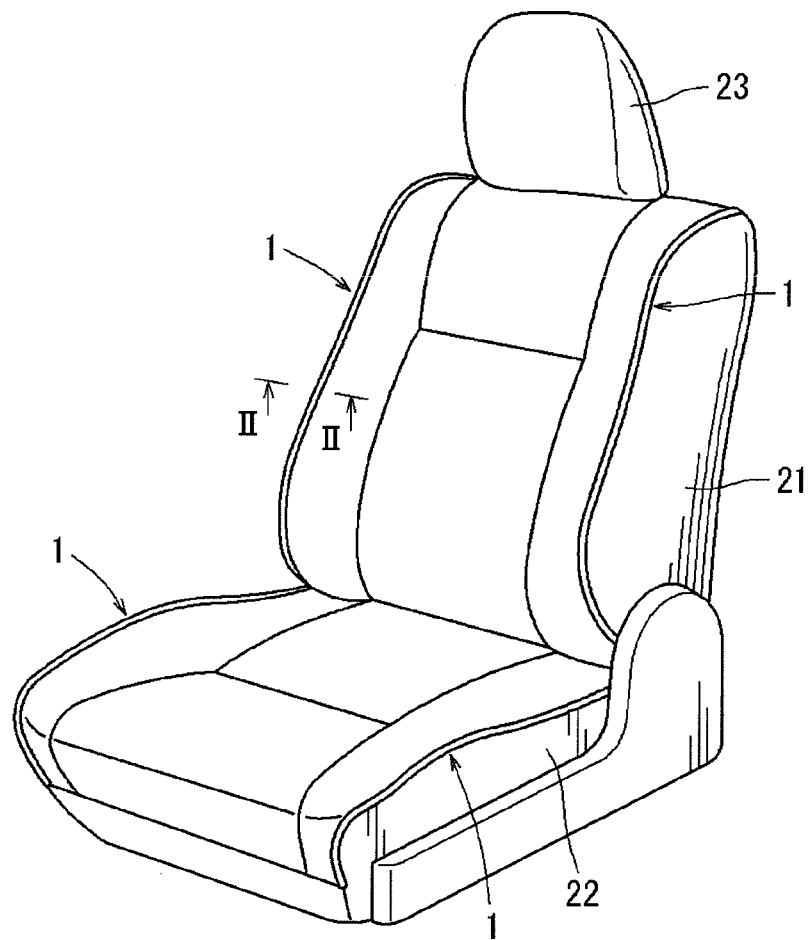
[Fig. 2]
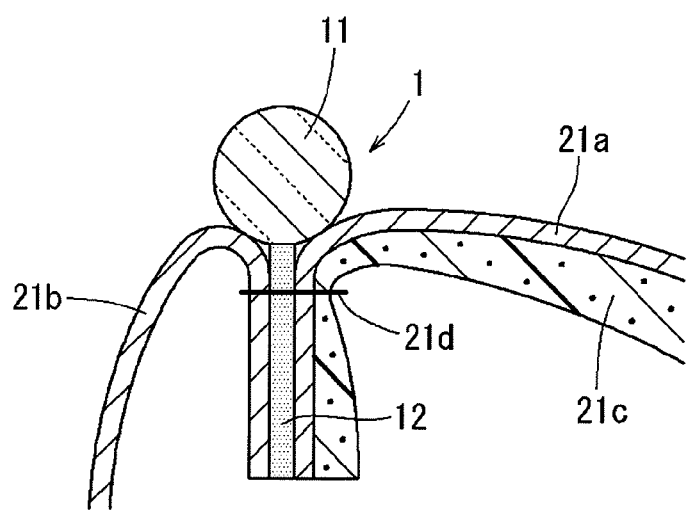

[Fig. 3]
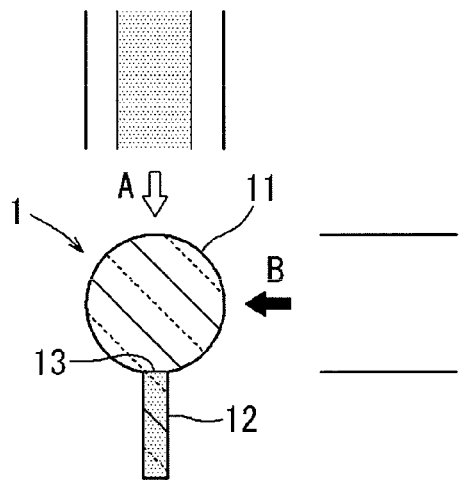
[Fig. 4]
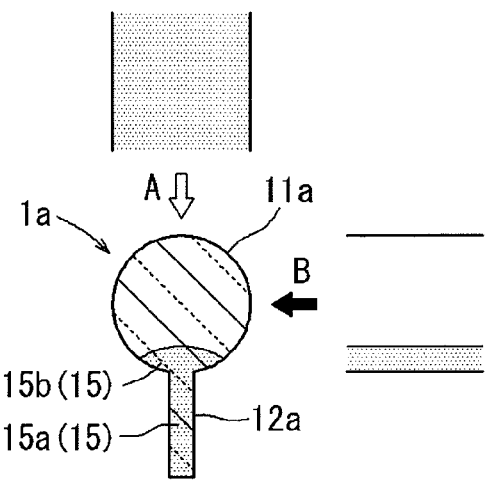
[Fig. 5]
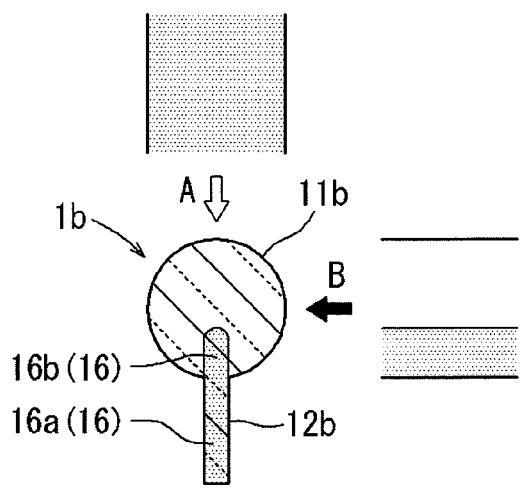

[Fig. 6]
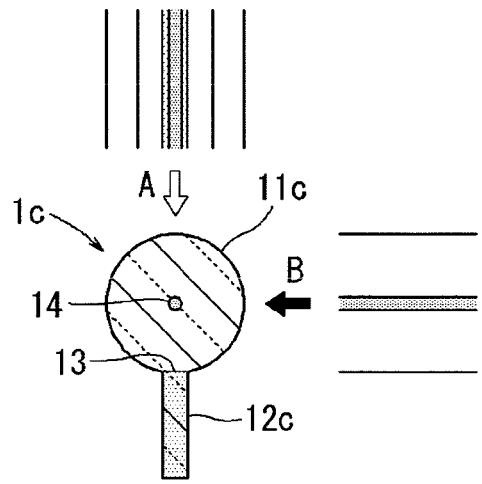
[Fig. 7]
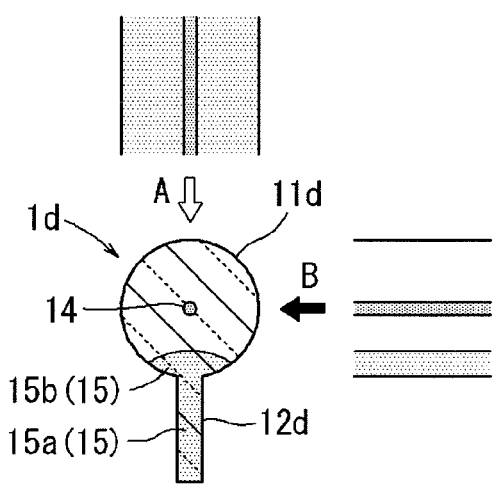
[Fig. 8]
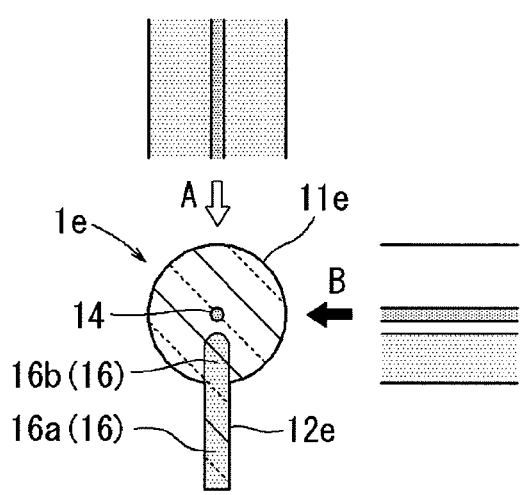

[Fig. 9]
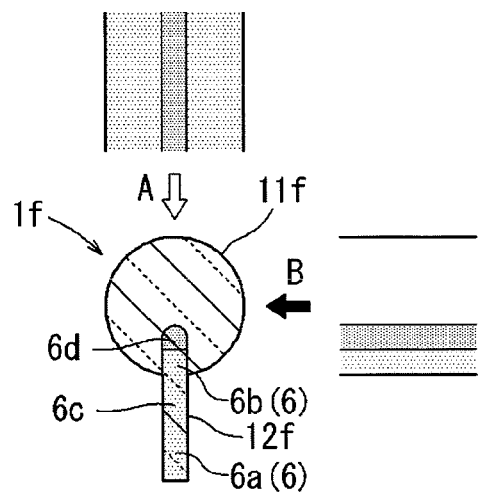
[Fig. 10]
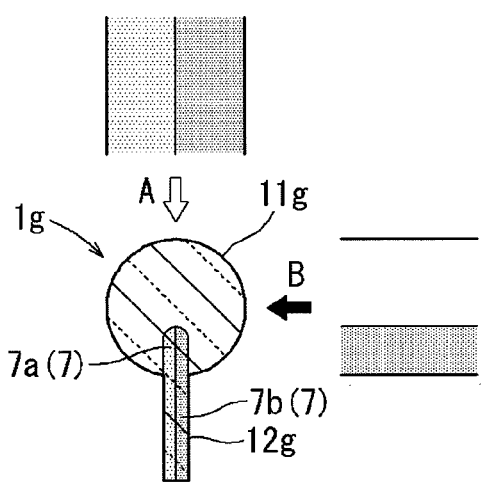
[Fig. 11]
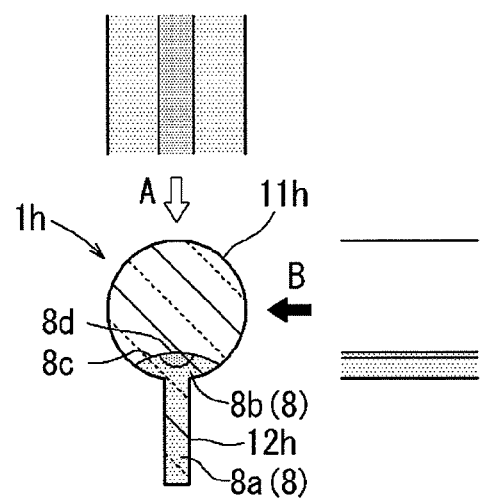

[Fig. 12]
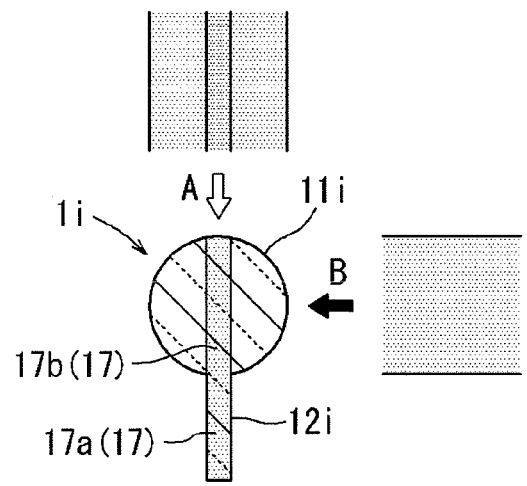
[Fig. 13]
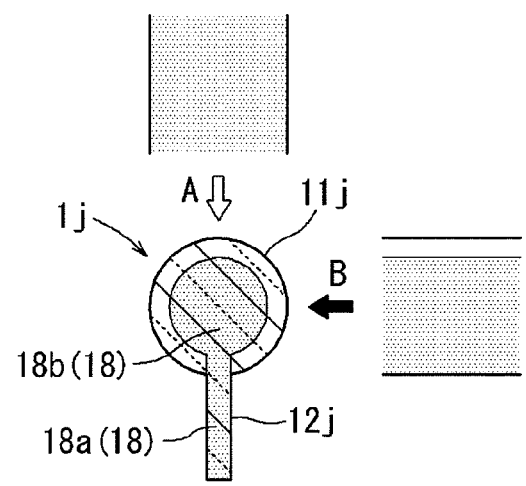
[Fig. 14]
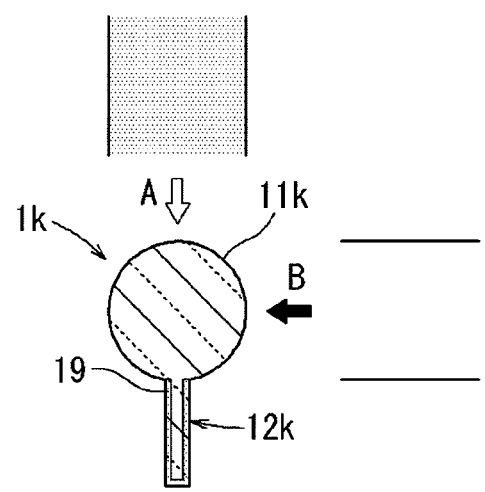

[Fig. 15]
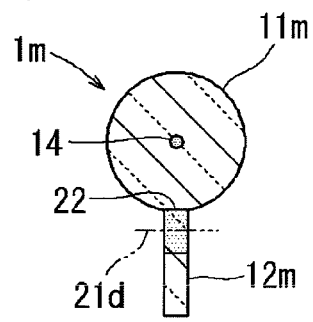
[Fig. 16]
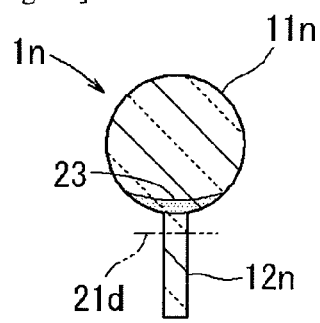
[Fig. 17]
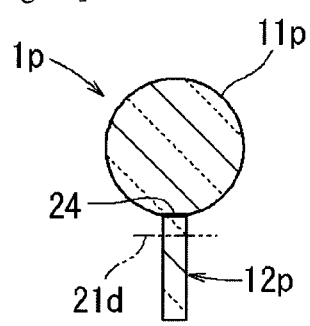

[Fig. 18]
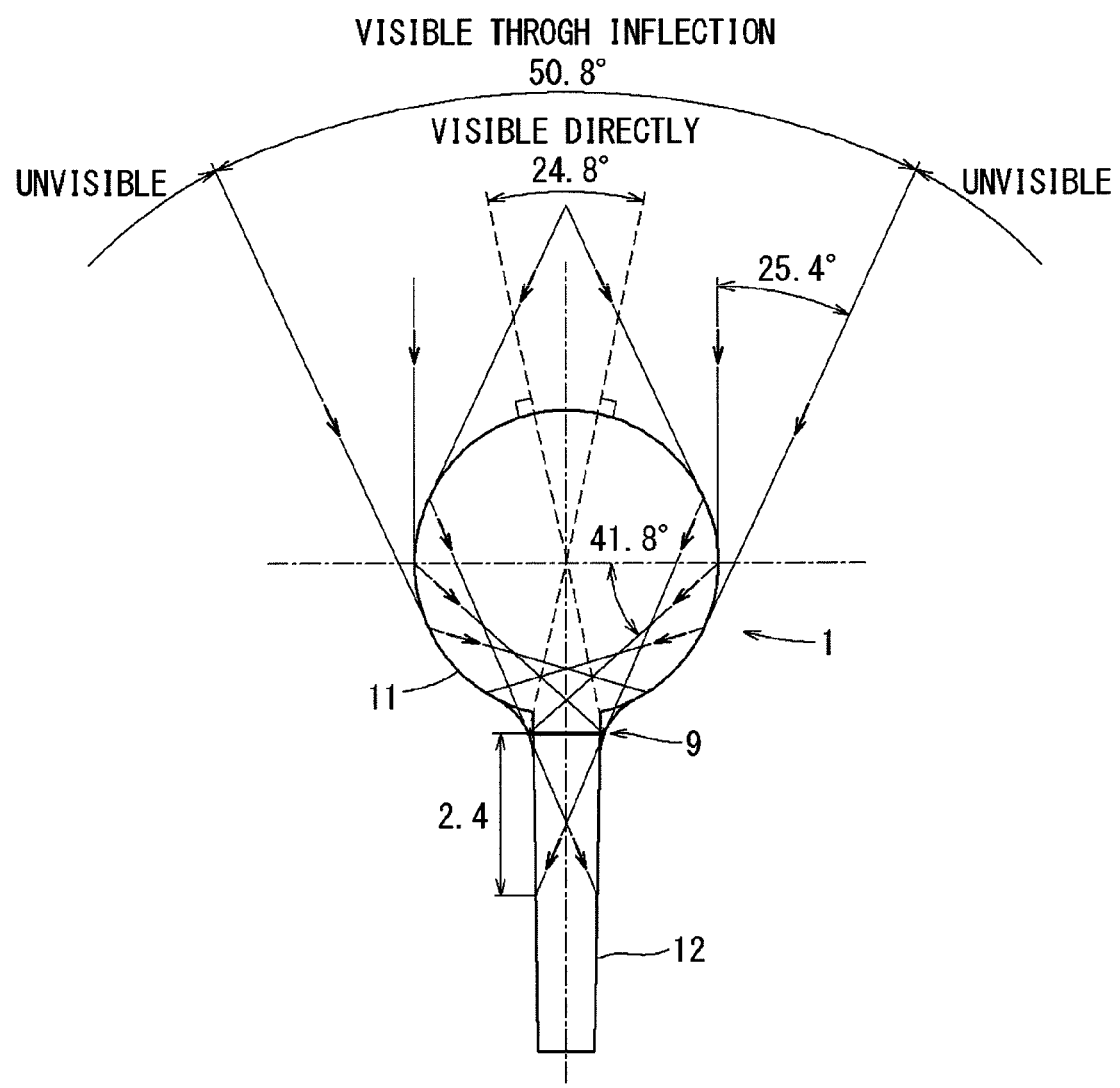

[Fig. 19]
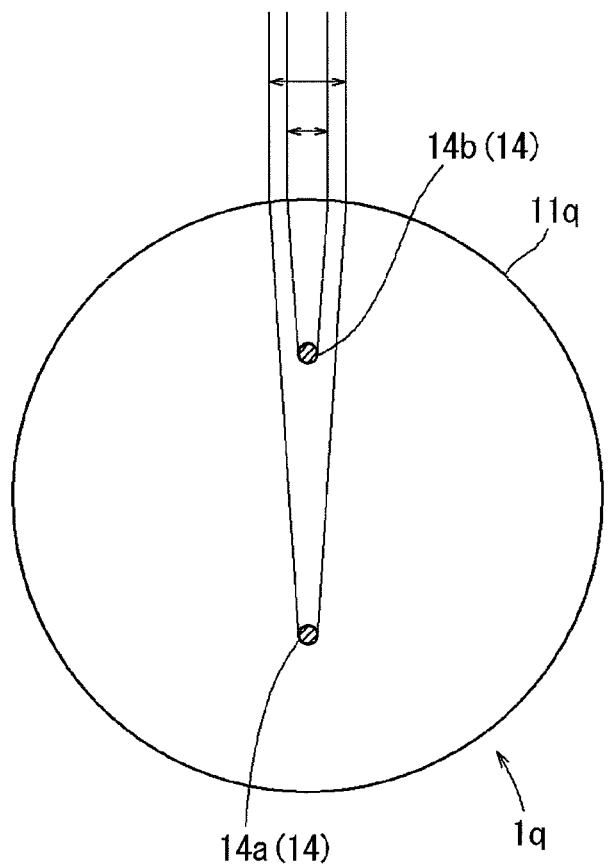
[Fig. 20]
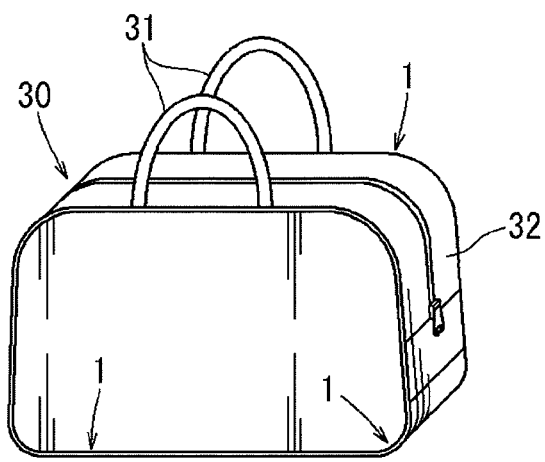

[Fig. 21]
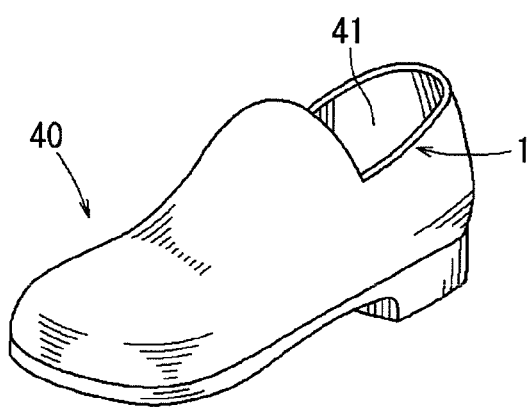
[Fig. 22]
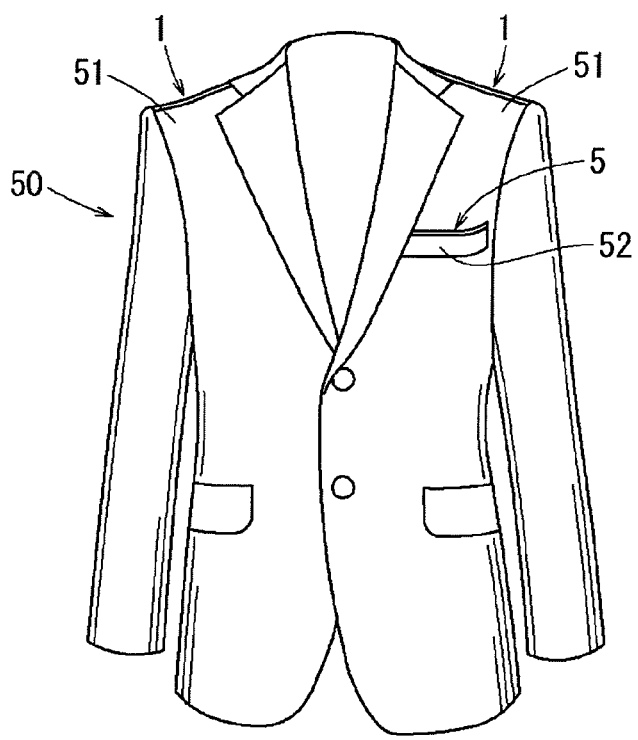

BEADINGS

CROSS-REFERENCE TO RELATED APPLICATIONS

The present application is a National Phase entry of, and claims priority to, PCT Application No. PCT/JP2014/004178, filed Aug. 12, 2014, which claims priority to Japanese Patent Application No. 2013-177824, filed Aug. 29, 2013, both of which are incorporated herein in their entireties by reference.

BACKGROUND

Embodiments of the present invention relate to beading. Beading is a linear member, is mounted to a target member in order to decorate the target member. Beading is used on an automotive seat or the like.

Beading is provided, for example, at the outer edges of a seat cushion of an automotive seat and the outer edges of a seatback of the automotive seat. Beading refers to a linear decoration member, which adds appearance to the seat. Japanese Laid-Open Utility Model Publication No. 1-177600 discloses a seat having beading consisting of an optical fiber covered with transparent resin.

Beading is sewn onto a seat skin with thread. When beading is formed of a material having high light transmittance, the thread is visible from the outside through the beading. This may deteriorate the outward appearance of the seat. Beading has a linear member and a plate-like leg portion. The leg portion is provided integrally with the linear member. The leg portion is sewn onto a main member such as a seat skin by sewing thread. The linear member is formed of material having high light transmittance. The linear member has at least a part of a circular cross-section. Thus the linear member functions as a lens. As a result, the sewing thread is visible through the linear member.

Therefore, there is a need in the art for beading in which the sewing thread is not easily seen from the outside, even when the beading is formed of a material having high light transmittance.

SUMMARY

According to an aspect of the invention, certain embodiments of the present invention include beading for decorating a target member. Beading has a linear member, a leg portion and a colored portion. The linear member has a main portion formed of a light-transmitting material. The linear member has a first end and a second end opposite the first end on an outer periphery thereof. The leg portion extends from the first end of the linear member. The leg portion has a sewn portion that is sewn onto the target member by sewing thread. The colored portion is provided in the linear member or the leg portion. The colored portion has a smaller quantity of transmitting light than that of the main portion. The colored portion is situated and configured to suppress the visibility of the sewing thread when the linear member is seen from above the second end.

The leg portion is superimposed on the target member, and is sewn onto the target member by the sewing thread. As a result, the beading is attached to the target member. The main portion of the linear member enhances the decoration property of the beading since the main portion is formed of a light transmitting material. When the linear member is seen from above the second end, the colored portion suppresses the visibility of the sewing thread. This helps to achieve an improvement in terms of the outward appearance of the beading.

According to another aspect, the colored portion may be provided on at least the first end of the linear member. According to another aspect, the colored portion may be provided at least between the first end and the sewn portion of the leg portion.

According to another aspect, the linear member and the leg portion may be formed of a material including the light-transmitting material. The colored portion may be formed of a material obtained by coloring the light-transmitting material. According to another aspect, the colored portion may be a film.

The linear member and the leg portion may be integrally molded through two-color molding. Thus, the beading can be molded than that having a configuration where the linear member and the leg portion are formed of different materials.

According to another aspect, the linear member or the leg portion is provided with a decoration member. The decoration member is situated so as to be visible in a region where the colored portion is visible when the linear member is seen from above the second end. Thus, when the linear member is seen from above the second end, the decoration member appears to be raised with respect to the colored portion. This helps to enhance the design property of the beading.

According to another aspect, the decoration member may be provided at the center of the linear member and extend in the longitudinal direction of the linear member. According to another aspect, the decoration member may be provided in the linear member. The decoration member may be situated nearer the second end in relation to the colored portion.

According to another aspect, the colored portion may be provided in the entirety of the linear member. According to another aspect, the colored portion may have a first portion provided in the leg portion and a second portion protruding from the first portion into the linear member. According to another aspect, the colored portion may have a convex shape starting from the leg portion. According to another aspect, the colored portion may be provided in the linear member and be concave to the leg portion.

According to another aspect, the colored portion may have a first color portion situated at a distal end thereof and a second color portion having different color from that of the first color portion. According to another aspect, the colored portion may have a first color portion situated on a first side surface thereof and a second color portion situated on a second side surface. The second side surface is preferably opposite the first side surface. The second color portion has a different color from that of the first color portion.

BRIEF DESCRIPTION OF THE DRAWINGS

FIG. 1 is a perspective view of an automobile seat having beading;

FIG. 2 is a cross-sectional view taken along line II-II in FIG. 1;

FIG. 3 is a cross-sectional view of the beading with visibility views of the beading;

FIG. 4 is a cross-sectional view of another beading with visibility views of the beading;

FIG. 5 is a cross-sectional view of another beading with visibility views of the beading;

FIG. 6 is a cross-sectional view of another beading with visibility views of the beading;

FIG. 7 is a cross-sectional view of another beading with visibility views of the beading;

FIG. 8 is a cross-sectional view of another beading with visibility views of the beading;

FIG. 9 is a cross-sectional view of another beading with visibility views of the beading;

FIG. 10 is a cross-sectional view of another beading with visibility views of the beading;

FIG. 11 is a cross-sectional view of another beading with visibility views of the beading;

FIG. 12 is a cross-sectional view of another beading with visibility views of the beading;

FIG. 13 is a cross-sectional view of another beading with visibility views of the beading;

FIG. 14 is a cross-sectional view of another beading with visibility views of the beading;

FIG. 15 is a cross-sectional view of another beading;

FIG. 16 is a cross-sectional view of another beading;

FIG. 17 is a cross-sectional view of another beading;

FIG. 18 is a cross-sectional view of beading for illustrating paths of light transmittance;

FIG. 19 is a cross-sectional view of beading having decoration materials for illustrating visibilities of the decoration materials;

FIG. 20 is a perspective view of a bag having beading;

FIG. 21 is a perspective view of a shoe having beading; and

FIG. 22 is a perspective view of clothing having beading;

DESCRIPTION OF THE EMBODIMENTS

Each of the additional features and teachings disclosed above and below may be utilized separately or in conjunction with other features and teachings to provide improved beadings. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

FIGS. 1 and 2 show an embodiment in which an automotive seat is provided with beading 1. The seat has a seatback 21 and a seat cushion 22. Each of the seatback 21 and the seat cushion 22 has a main plate portion and side portions. Boundary portions between the main plate portions and the side portions are situated at the outer edges of the seat back 21 and of the seat cushion 22. The beading 1 is provided at the boundary portions.

The beading 1 integrally has a linear member 11 and a leg portion 12. The linear member 11 has a predetermined thickness and a substantially circular cross-section. The linear member 11 has a larger diameter than the leg portion 12. The leg portion 12 is of a plate-like configuration, and is provided integrally at a portion of the outer peripheral edge of the beading 1. The linear member 11 and the leg portion 12 have substantially the same length in the longitudinal direction.

As shown in FIG. 2, the seat has a seat cover 21a covering the main plate portion, and a seat cover 21b covering the side portion. The leg portion 12 of the beading 1 is installed between ends of the seat covers 21a and 21b. The end of the leg portion 12 and the ends of the seat covers 21a and 21b are sewn together by sewing thread 21d.

The linear member 11 protrudes from the boundary between the seat covers 21a and 21b. As a result, the beading 1 gives the seat decoration. FIG. 2 shows the beading 1 of the seatback 21. The beading 1 of the seat cushion 22 is of the same structure as the beading 1 of the seatback 21. A cover pad 21c is provided on the back surface of the seat cover 21a.

The linear member 11 is formed of a light-transmitting material. The linear member 11 has a main portion formed solely of the light-transmitting material. The light-transmitting material of the beading enhances the decoration. The leg portion 12 is formed of a colored material obtained by coloring the light-transmitting material. The colored material is of a non-light-transmitting material or a material of lower light transmittance than the linear member 11. The leg portion 12 and the linear member 11 are formed integrally through two-color molding. The color of the leg portion 12 suppresses the visibility of the sewing thread from the outside of the linear member 11. If no color is added to the leg portion 12, the thread 21d is visible from the outside of the linear member 11.

FIG. 18 illustrates how light is transmitted through the beading 1 from the outside of the beading 1. The beading 1 is formed of a resin material having a predetermined refractive index. For example, urethane has a refractive index of 1.5. When light travels in a direction tangent to the outer peripheral surface of the linear member 11, the light is incident in the linear member 11 from the outer peripheral surface at a refraction angle that is approximately 41.8 degrees. The thickness of the leg portion 12 is set to be anywhere from 10 to 50%, for example 10% of the maximum outer diameter of the linear member 11.

When the linear member 11 is seen from the side opposite the leg portion 12, a portion 9 corresponding to the sewing thread is visible within a first range. The first range is a range near 24.8 degrees which passes the center of the sectional circle. The leg portion 12 is sewn onto the seat covers 21a and 21b by the sewing thread 21d (see FIG. 2). The portion 9 corresponds to the position where the sewing thread 21d passes the leg portion 12.

Within a second range, the portion 9 corresponding to the sewing thread is directly or indirectly visible. The second range is a range extending around the first range. The second range is situated between two tangents of the linear member 11. The angle made by the two tangents is approximately 50.8 degrees. Within the second range, light is refracted within the linear member 11, so that the portion 9 corresponding to the sewing thread is visible. The portion 9 corresponding to the sewing thread cannot be seen from the outside of the second range. Within the first range, the portion 9 and a predetermined region in the leg portion can be directly seen. The portion 9 corresponding to the sewing thread is situated at the predetermined region. The predetermined region extends from the portion 9 toward the distal end of the leg portion 12 to a middle position. The middle position is spaced away from the portion 9 by a distance of 2.4 times the thickness of the leg portion 12.

FIG. 3 shows the way the beading is seen from direction A and direction B. Direction A is a direction in which the linear member 11 is seen from the side opposite the leg portion 12. Direction B is a direction making an angle of approximately 90 degrees with direction A. When seen from direction A, the colored portion 13 of the leg portion 12 is directly or indirectly visible within the first range and the second range. The colored portion 13 of the leg portion 12 is seen at the center of the linear member 11. The sewing thread 21d is provided on the leg portion 12 so as to pass through the leg portion 12. Thus, due to the colored portion 13 of the leg portion 12, the sewing thread 21d is not visible from direction A. The sewing thread 21d is not visible from direction B, either.

In the embodiment of FIG. 3, the sewing thread 21d passes the colored portion 13 of the leg portion 12. Thus, it is possible to suppress the visibility of the sewing thread 21d from the outside of the linear member 11. As a result, it is possible for the colored portion 13 to suppress deterioration in the outward appearance of the beading 1.

The leg portion 12 is colored. As a result, no light is transmitted through the leg portion 12. Alternatively, it is more difficult for light to be transmitted through the leg portion 12 than through the linear member 11. The linear member 11 and the leg portion 12 may be formed of the same material. As compared to the situation where they are formed of different materials, the linear member 11 and the leg portion 12 can be formed more easily.

When the linear member 11 is seen from direction A of FIG. 3, the colored portion 13 is visible at the center of the linear member 11. The direction A is from the side opposite the leg portion 12. The linear member 11 has a first end on which the leg portion 12 is provided and a second end opposite to the first end. The direction A is from the side above the second end. The linear member 11 is transparent, and extends in a strip-like fashion. The strip of the colored portion 13 is visible at the center of the linear member extending in a strip-like fashion. As a result, three strips are visible. As a result, the colored portion 13 can enhance the design property of the linear member 11.

The automotive seat may have a beading 1a shown in FIG. 4 instead of the beading 1 shown in FIG. 3. The beading 1a includes a linear member 11a, a leg portion 12a and a colored portion 15. As shown in FIG. 3, the colored portion 13 is provided solely in the leg portion 12. The colored portion 13 is provided in the entire leg portion 12. On the other hand, the colored portion 15 of FIG. 4 has a first portion 15a provided in the leg portion 12a and a second portion 15b provided in a part of the linear member 11a.

The second portion 15b of the colored portion 15 is formed in a region of the linear member 11a near the leg portion 12a. The second portion 15b occupies the region that covers from one tenth to half of the sectional area of the linear member 11a. The linear member 11a includes the second portion 15b of the colored portion 15, and a main portion constituting the rest thereof. When forming the beading 1a through two-color molding, the pressure supply to the mold for the colored material is set high. This makes it possible for the colored portion 15 to be larger than the colored portion 13 of FIG. 3.

When the linear member 11a of FIG. 4 is seen from direction A, the colored portion 15 is visible throughout the linear member 11a. When it is seen from direction B, the colored portion 15 is visible so as to occupy approximately one tenth to one third or half of the linear member 11a. The colored portion 15 is also formed in a part of the linear member 11a. Thus, even if there is variation in the position of the sewing thread 21d, it is possible to suitably suppress the visibility of the sewing thread 21d from the outside of the linear member 11a.

Even if there is variation in the boundary position between the stained portion having the colored portion 15 and the transparent portion having no colored portion 15, it is possible to suitably suppress the visibility of the thread 21d from the outside of the linear member 11a. The boundary between the stained portion and the transparent portion is larger than that of the beading 1 of FIG. 3. Thus, the stained portion and the transparent portion may be firmly bonded to each other. This helps to suppress separation between the stained portion and the transparent portion. It is desirable to impart embossing with small protrusions and recesses to be bonding surfaces of the stained portion and the transparent portion. This helps to further enhance the bonding strength between the stained portion and the transparent portion.

The automotive seat may have a beading 1b shown in FIG. 5 instead of the beading 1 shown in FIG. 3. The beading 1b includes a linear member 11b, a leg portion 12b and a colored portion 16. The colored portion 16 has a first portion 16a provided in the leg portion 12b, and a protrusion 16b protruding from the leg portion 12b into the linear member 11b. The linear member 11b includes the protrusion 16b of the colored portion 16 and a main portion constituting the rest thereof.

When the linear member 11b of FIG. 5 is seen from direction A, the colored portion 16 is visible throughout the linear member 11b. When it is sheen from direction B, the protrusion 16b of the colored portion 16 protruding into the linear member 11b is visible. The colored portion 16 is formed in the linear member 11b. Thus, the beading 1b of FIG. 5 can provide the same effect as that of the beading 1a of FIG. 4.

The automotive seat may have a beading 1c shown in FIG. 6 instead of the beading 1 shown in FIG. 3. The beading 1c includes a linear member 11c, a leg portion 12c, a colored portion 13 and a decoration material 14. The decoration material 14 consists of, for example, thread. The decoration material 14 is inserted at the center of the sectional circle of the linear member 11c. The decoration material 14 may consist of sliver thread, lame thread, coarse yarn, monofilament, braided material or the like. When molding the beading 1c, the decoration material 14 is set in the mold as an insert material. The decoration material 14 is set in the mold so as to extend along the longitudinal direction of the linear member 11c.

As shown in FIG. 6, when the linear member 11c is seen from direction A, the colored portion 13 of the leg portion 12c is visible at the center of the linear member 11c. The decoration material 14 is visible on the inner side of the colored portion 13. When seen from direction A, the colored portion 13 and the decoration material 14 overlap each other at the center of the linear member 11. As a result, the decoration material 14 appears to be raised because the colored portion 13 is situated below the decoration material 14. When seen from direction B, the decoration material 14 is visible at the center of the linear member 11c.

In the beading 1c of FIG. 6, the sewing thread 21d is not seen from the outside of the linear member 11c due to the colored portion 13 provided in the leg portion 12c. When seen from the outside of the linear member 11c, the decoration material 14 appears to be raised over the colored portion 13. As a result, the beading 1 provides a highly decorative effect.

The way the decoration material 14 is seen from the outside of the linear member 11*q* will be described with reference to FIG. 19. The way the decoration material 14 looks differs according to its position in the linear member 11*q*. The nearer to the viewing position, the smaller the decoration material 14*b* looks. The farther from the viewing position, the larger the decoration material 14*a* looks. This is due to the fact that the linear member 11*q* functions as a lens.

In FIG. 6, the decoration material 14 appears to be raised on the inner side of the colored portion 13. The overlapping position and overlapping ratio of the decoration material 14 with respect to the colored portion 13 are adjusted according to its position in the linear member 11*c*. The nearer to the colored portion 13 the decoration material 14 is, the thinner the decoration material 14 looks. The farther from the colored portion 13 the decoration material 14 is, the thicker the decoration material 14 looks. It is also possible to hide the colored portion 13 using the decoration material 14.

The automotive seat may have a beading 1*d* shown in FIG. 7 instead of the beading 1 shown in FIG. 3. The beading 1*d* includes a linear member 11*d*, a leg portion 12*d*, a colored portion 15 and a decoration material 14. The decoration material 14 of FIG. 7 is formed in the same manner as the decoration material 14 of FIG. 6. As shown in FIG. 7, when the linear member 11*d* is seen from direction A, the colored portion 15 is visible throughout the linear member 11*d* as in the case of FIG. 4. The decoration material 14 appears to be raised at the center of the linear member 11*d*. From direction B, the colored portion 15 is visible in the portion of the linear member 11*d* near the leg portion 12*d*. The decoration material 14 is visible at the center of the linear member 11*d*.

The automotive seat may have a beading 1*e* shown in FIG. 8 instead of the beading 1 shown in FIG. 3. The beading 1*e* includes a linear member 11*e*, a leg portion 12*e*, a colored portion 16 and a decoration material 14. The decoration material 14 of FIG. 8 is formed in the same manner as the decoration material 14 of FIG. 6. As shown in FIG. 8, when the linear member 11*e* is seen from direction A, the colored portion 16 is visible throughout the linear member 11*e* as in the case of FIG. 5. The decoration material 14 appears to be raised at the center of the linear member 11*e*. From direction B, the colored portion 16 is visible in the portion of the linear member 11*e* near the leg portion 12*e*. The decoration material 14 is visible at the center of the linear member 11*e*.

The automotive seat may have a beading if shown in FIG. 9 instead of the beading 1 shown in FIG. 3. The beading if includes a linear member 11*f*, a leg portion 12*f* and a colored portion 6. The colored portion 6 has a plurality of colors. The colored portion 6 has a first portion 6*a* provided in the leg portion 12*f*, and a protrusion 6*b* protruding from the leg portion 12*f* into the linear member 11*f*.

The colored portion 6 of FIG. 9 has a first color portion 6*c* and a second color portion 6*d*. The second color portion 6*d* is situated at the distal end of the protrusion 6*b*. The second color portion 6*d* is, for example, red in color. The first color portion 6*c* is situated at the first portion 6*a* and the proximal portion of the protrusion 6*b*. The first color portion 6*c* has a different color from the second color portion 6*d*, for example, blue in color. The first color portion 16*c* and the second color portion 16*d* are formed through the same material containing different coloring materials. The linear member 11*f* and the leg portion 12*f* are formed integrally through two-color molding.

As shown in FIG. 9, when the linear member 11*f* is seen from direction A, the blue color of first color portion 6*c* is visible throughout the linear member 11*f* without the center. The red color of the second color portion 6*d* is visible at the center of the linear member 11*f*. From direction B, the blue color of the first color portion 6*c* is visible at the portion of the linear member 11*f* near the leg portion 12*f*. The red color of the second color portion 6*d* is visible next to the first color portion 6*c*.

In FIG. 9, the colored portion 6 has a plurality of portions of different colors. Thus, the beading if provides a novel design. By varying the color combination of the first color portion 6*c* and the second color portion 6*d*, it is possible to provide various designs of different tastes.

The automotive seat may have a beading 1*g* shown in FIG. 10 instead of the beading 1 shown in FIG. 3. The beading 1*g* includes a linear member 11*g*, a leg portion 12*g* and a colored portion 7. The colored portion 7 has a first portion 6*a* provided in the leg portion 12*f*, and a protrusion 6*b* protruding from the leg portion 12*f* into the linear member 11*f*. The colored portion 7 has a first portion provided in the leg portion 12*g*, and a protrusion protruding from the leg portion 12*g* into the linear member 11*g*.

As shown in FIG. 10, the colored portion 7 has a plurality of colors, e.g., two colors. The colored portion 7 has a first color portion 7*a* and a second color portion 7*b*. The first color portion 7*a* is situated on a first side surface of the leg portion 12*g*. The first color portion 7*a* is, for example, blue in color. The second color portion 7*b* is situated on a second side surface of the leg portion 12*g*. The second color portion 7*b* is, for example, red in color. The first color portion 7*a* and the second color portion 7*b* are formed through the same material containing coloring materials of different colors. The linear member 11*g* and the leg portion 12*g* are formed integrally through two-color molding.

As shown in FIG. 10, when the linear member 11*g* is seen from direction A, half the linear member 11*g* corresponding to the first surface of the leg portion 12*g* is of blue color due to the color of the first color portion 7*a*. Half the linear member 11*g* corresponding to the second surface of the leg portion 12*g* is of red color due to the color of the second color portion 7*b*.

The automotive seat may have a beading 1*h* shown in FIG. 11 instead of the beading 1 shown in FIG. 3. The beading 1*h* includes a linear member 11*h*, a leg portion 12*h* and a colored portion 8. The colored portion 8 has a plurality of colors, e.g., two colors. The colored portion 8 has a first portion 8*a* provided in the leg portion 12*h* and a second portion 8*b* provided in a part of the linear member 11*h*. The colored portion 8 has a first color portion 8*c* and a second color portion 8*d*.

The first color portion 8*c* in FIG. 11 is, for example, blue in color. The second color portion 8*d* is, for example, red in color. The second color portion 8*d* is provided at a part of a second portion 8*b* of the colored portion 8, e.g., on the side opposite the leg portion 12*h*. The width of the second color portion 8*d* is equivalent to that of the leg portion 12*h*. The first color portion 8*c* and the second color portion 8*d* are formed through the same material containing different coloring materials. The linear member 11*h* and the leg portion 12*h* are integrally formed through two-color molding.

As shown in FIG. 11, when the linear member 11*h* is seen from direction A, the red color of the second color portion 8*d* is visible at the center of the linear member 11*h*. From direction B, the blue color of the first color portion 8*c* is visible at a portion near the leg portion 12*h* of the linear member 11*h*. The red color of the second color portion 8*d* is slightly visible next to the blue color.

The automotive seat may have a beading 1*i* shown in FIG. 12 instead of the beading 1 shown in FIG. 3. The beading 1*i* includes a linear member 11*i*, a leg portion 12*i* and a colored portion 17. The colored portion 17 extends longer within the linear portion 11*i* than the colored portion 16 of FIG. 5. The colored portion 17 has a first portion 17*a* provided in the leg portion 12*i* and a second portion 17*b* provided in the linear member 11*i*. The second portion 17*b* extends linearly from the distal end of the first portion 17*a*. The second portion 17*b* has the same length as the diameter of the linear member 11*i*, and extends through the linear member 11*i*.

The first portion 17*a* and the second portion 17*b* of the colored portion 17 are formed simultaneously. A light-transmitting material is provided on both sides of the second portion 17*b* so as to form the main portion of the linear member 11*i*. The linear member 11*i* and the leg portion 12*i* are formed integrally through two-color molding. The main portion of the linear member 11*i* and the colored portion 17 are formed of the same material, and the colored portion 17 contains a coloring material.

As shown in FIG. 12, when the linear member 11*i* is seen from direction A, the colored portion 17 is directly visible at the center of the linear member 11. Due to the refraction from the light-transmitting member the colored portion 17 is visible on both sides of the colored portion 17. From direction B, the colored portion 17 is visible through the light-transmitting material of the linear member 11*i*. The way the beading 1*i* looks is different from the way the beading 1*b* of FIG. 5 looks.

The automotive seat may have a beading 1*j* shown in FIG. 13 instead of the beading 1 shown in FIG. 3. The beading 1*j* includes a linear member 11*j*, a leg portion 12*j* and a colored portion 18. Within the linear member 11*j*, the colored portion 18 is larger than the colored portion 16 of FIG. 5. The colored portion 18 has a first portion 18*a* provided in the leg portion 12*j* and a second portion 18*b* provided in the linear member 11*j*. The second portion 18*b* protrudes into the linear member 11*j* from the distal end of the first portion 18*a*. The second portion 18*b* is of a configuration similar to that of the linear member 11*j*.

The first portion 18*a* and the second portion 18*b* of the colored portion 18 are formed simultaneously. A light-transmitting material is provided around the second portion 18*b* so as to form the main portion of the linear member 11*j*. The linear member 11*j* and the leg portion 12*j* are formed integrally through two-color molding. The main portion of the linear member 11*j* and the colored portion 18 are formed of the same material, and the colored portion 18 contains a coloring material.

As shown in FIG. 13, when the linear member 11*j* is seen from direction A, the colored portion 18 is visible throughout the linear member 11*j*. When seen from direction B, the second portion 18*b* of the colored portion 18 is visible. In the beading 1*j* of FIG. 13, the colored portion 18 is visible in a larger range when seen from direction B than in the beading 1*b* of FIG. 5.

The automotive seat may have a beading 1*k* shown in FIG. 14 instead of the beading 1 shown in FIG. 3. The beading 1*k* includes a linear member 11*k*, a leg portion 12*k* and a colored portion 19. The colored portion 19 is provided solely in the outer region of the leg portion 12*k*. The leg portion 12*k* has a main portion containing no coloring material in the inner region. The main portion is covered with the colored portion 19. The linear member 11*k* and the leg portion 12*k* are formed simultaneously of a light-transmitting material. The main portion and the colored portion 19 of the leg portion 12*k* are formed integrally through two-color molding. The colored portion 19 contains a coloring material.

As shown in FIG. 14, when the linear member 11*k* is seen from direction A, the colored portion 19 is visible throughout the linear member 11*k*. When seen from direction B, the colored portion 19 is not visible. When the linear member 11*k* is seen from direction A, the colored portion 19 is visible throughout the linear member 11*k*. As referring to FIG. 18, the colored portion 19 on the outer side of the leg portion 12*k* is visible through the interior of the leg portion 12*k* due to the reflection of light. In the beading 1*k* of FIG. 14, the colored portion 19 is visible in a wider range when seen from direction A than in the beading 1 of FIG. 3.

The automotive seat may have a beading 1*m*, 1*n* or 1*p* as shown in FIGS. 15 to 17 instead of the beading 1 shown in FIG. 3. Each of the beading 1*m*, 1*n* or 1*p* includes a linear member 11*m*, 11*n*, 11*p*, a leg portion 12*m*, 12*n*, 12*p* and a colored portion 22, 23, 24. The colored portion 22 of FIG. 15 is provided solely on a top region of the leg portion 12*m*. The top region includes a portion where the sewing thread 21*d* passes through. The colored portion 22 occupies substantially half the region of the leg portion 12*m* nearer to the linear member 11*m*. The leg portion 12*m* including the colored portion 22 and the linear member 11*m* are formed integrally through two-color molding. The linear member 11*m* is molded while the decoration material 14 is inserted as an insert material.

In the beading 1*m* of FIG. 15, the sewing thread 21*d* is not visible from the outside of the linear member 11*m* due to the colored portion 22 because of the same reason as the beading 1*c* of FIG. 6. When seen from the outside of the linear member 11*m*, the decoration material 14 appears to be raised over the colored portion 22. The colored portion 22 is smaller than the colored portion 13 of FIG. 6. This helps to economize on the coloring material.

The beading 1*n* of FIG. 16 has a colored portion 23. The colored portion 23 is not provided in the leg portion 12*n* where the sewing thread 21*d* is passed through. The colored portion 23 is provided solely in a region of the linear member 11*n* near the leg portion 12*n*. The colored portion 15 of FIG. 4 may have a convex shape starting from the leg portion 12*a*. In contrast, the colored portion 23 is concave. The leg portion 12*n* and the linear member 11*n* including the colored portion 23 are formed integrally through two-color molding. The linear member 11*n* has the colored portion 23 and the main portion other than the colored portion 23.

In the beading 1*n* of FIG. 16, the sewing thread 21*d* is not visible from the outside of the linear member 11*n* due to the colored portion 23. This is similar to the beading 1*a* of FIG. 4. The colored portion 23 is smaller than the colored portion 15 of FIG. 4. This helps to economize on the coloring material.

The beading 1*p* of FIG. 17 has a colored portion 24. The colored portion 24 has a colored film. The colored portion 24 is provided at the boundary between the leg portion 12*p* and the linear member 11*p*. The boundary between the leg portion 12*p* and the linear member 11*p* undergoes a non-light-transmitting process using the colored portion 24. The linear member 11*p* and the leg portion 12*p* are integrated with each other through bonding or fusion-bonding, with the colored portion 24 therebetween.

In the beading 1*p* of FIG. 17, the sewing thread 21*d* is not visible from the outside of the linear member 11*p* due to the colored portion 24. As in the beading 1 of FIG. 3, in the beading 1*p* of FIG. 17, when seen from direction A, the strip of the colored portion 24 is visible at the center of the linear member 11p. The colored portion 24 can enhance the design property of the linear member 11p.

As shown in FIGS. 1 and 2, the beading 1 is applicable to an automotive seat (target member). Alternatively, as shown in FIGS. 20 to 22, the beading 1 is also applicable to a bag 30, a shoe 40, clothing 50, etc. The beading 1 shown in FIGS. 20 to 22 may be changed into other beadings shown in FIGS. 4 to 17.

The bag 30 shown in FIG. 20 has a main body portion 32 and grips 31. The beadings 1 are provided at the outer edges of the side surfaces of the main body portion 32. The beadings are provided over the entire periphery of the outer edges of the side surfaces of the main body portion 32.

The shoe 40 shown in FIG. 21 has an insertion inlet 41 through which a foot is to be inserted. The beading 1 is provided at the edge portion of the insertion inlet 41.

The clothing 50 shown in FIG. 22 is a jacket, which has shoulder portions 51 and a breast pocket 52. The beadings 1 are respectively provided at the top portions of the shoulder portions 51 and at the insertion inlet edge of the breast pocket 52.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As shown in FIG. 3, the leg portion 12 of the beading 1 is of a plate-like configuration having a smooth surface. Alternatively, the leg portion 12 may be of a plate-like configuration having a plurality of protrusions and recesses on the surfaces thereof. As described above, the decoration material 14 may be thread. Alternatively, the decoration material may be formed of a colored portion obtained through coloring, or a film material, etc.

As described above, the beading may be applicable to an automotive seat, a bag, a shoe or clothing. Alternatively, the beading may be applied, for example, to an automotive door trim or the like.

As described above, the decoration material 14 may be provided in the linear member. Alternatively or additionally, the decoration material 14 may be provided in the leg portion.

The invention claimed is:

1. A beading attached to a target member, the beading comprising:
    a bead member having a main portion formed of a light-transmitting material, the bead member having a first end and a second end opposite the first end on an outer periphery thereof,
    a leg portion integrally formed with and extending from the first end of the bead member, wherein the leg portion and the bead member are made of a continuous same material, the leg portion having a sewn portion that is attached to the target member by sewing thread,
    a colored portion provided in the bead member or the leg portion, the colored portion having a smaller quantity of transmitting light than that of the main portion, the colored portion being situated and configured to suppress the visibility of the sewing thread when the bead member is seen from above the second end,
    a first visual design of the bead member seen from a direction A, wherein the direction A is a direction in which the bead member is seen from the side opposite the leg portion, and
    a second visual design of the bead member seen from a direction B, wherein the direction B is a direction making an angle of approximately 90 degrees with respect to the direction A, and wherein the second visual design is different from the first visual design,
    wherein at least a portion of the beading protrudes from the target member.

2. The beading of claim 1, wherein the colored portion is provided on at least the first end of the bead member.

3. The beading of claim 1, wherein the colored portion is provided at least between the first end of the bead member and the sewn portion of the leg portion.

4. The beading of claim 1, wherein the colored portion is provided at an outer region of the leg portion.

5. The beading of claim 1, wherein the bead member and the leg portion are formed of a material having the same light-transmitting material.

6. The beading of claim 5, wherein the colored portion is formed of a material obtained by coloring the light-transmitting material.

7. The beading of claim 1, wherein the colored portion is a film.

8. The beading of claim 1, wherein the bead member and the leg portion are integrally molded through two-color molding.

9. The beading of claim 1, wherein the bead member or the leg portion is provided with a decoration member, and
    wherein the decoration member is situated so as to be visible in a part of a region where the colored portion is visible when the bead member is seen from above the second end.

10. The beading of claim 9, wherein the decoration member is provided at a center of the bead member, and extends in the longitudinal direction of the bead member.

11. The beading of claim 9, wherein the decoration member is provided in the bead member, and the decoration member is situated nearer to the second end in relation to the colored portion.

12. The beading of claim 1, wherein the colored portion is provided in the entirety of the bead member.

13. The beading of claim 1, wherein the colored portion comprises a first portion provided in the leg portion and a second portion that protrudes from the first portion into the bead member.

14. The beading of claim 1, wherein the colored portion has a convex shape starting from the leg portion.

15. The beading of claim 1, wherein the colored portion is provided in the bead member and is concave to the leg portion.

16. The beading of claim 1, wherein the colored portion comprises a first color portion situated at a distal end thereof and a second color portion having a different color from that of the first color portion.

17. The beading of claim 1, wherein the colored portion comprises a first color portion situated on a first side surface thereof and a second color portion situated on a second side surface opposite the first side surface, and wherein the second color portion has a different color from that of the first color portion.

* * * * *